Patented Mar. 19, 1935

1,995,016

UNITED STATES PATENT OFFICE 1,995,016

COMPOSITION CONTAINING DERIVATIVES OF CELLULOSE

George W. Seymour, Cumberland, Md., assignor to Celanese Corporation of America, a corporation of Delaware No Drawing. Application April 16, 1932, Serial No. 605,794

3 Claims. (Cl. 106—40)

This invention relates to the preparation of compositions containing derivatives of cellulose, and relates more particularly to such compositions wherein a new plasticizer or softening agent is used.

An object of my invention is to prepare compositions such as plastic or liquid coating compositions containing derivatives of cellulose wherein a naphthalene sulfonamid is employed as a plasticizer. Other objects of my invention will appear from the following detailed description.

I have found that the naphthalene sulfonamides are capable of forming solutions with derivatives of cellulose and are an excellent plasticizer, softening agent, or camphor substitute for use in conjunction with derivatives of cellulose to impart softness, pliability and other desirable properties to plastics, films, textiles, and other materials containing derivatives of cellulose.

In accordance with my invention I prepare compositions containing derivatives of cellulose and a naphthalene sulfonamide as plastifier or softening agent.

The naphthalene sulfonamide employed as a plasticizer in this invention may be any suitable one. However, I have found that the α naphthalene sulfonamide is more compatible with cellulose acetate than is the β naphthalene sulfonamide. The term "naphthalene sulfonamide" includes not only the compound $C_{10}H_7.SO_2.NH_2$, but includes those naphthalene sulfonamides containing nuclear substitution groups such as ethyl, methyl, amino or hydroxy groups. The naphthalene sulfonamides include also the alkyl naphthalene sulfonamide, such as the methyl-, ethyl-, dimethyl- and diethyl-naphthalene sulfonamide, an example being ethyl naphthalene sulfonamide, $C_{10}H_7.SO_2.NH.C_2H_5$.

The naphthalene sulfonamide may be prepared by treating the sodium salt of the α or β naphthalene sulfonic acid with phosphorus pentachloride to produce the corresponding sulfochloride which in turn is reacted with ammonia or substituted ammonias such as ethyl amine, to form the corresponding naphthalene sulfonamide.

Any suitable derivative of cellulose may be employed in conjunction with the naphthalene sulfonamide, such as cellulose nitrate but I prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

Plastic compositions containing the derivative of cellulose and the naphthalene sulfonamide may be made in any suitable manner and they may be worked up into sheets, rods, tubes, blocks or any other desired shape. Molding powder containing the derivative of cellulose and the naphthalene sulfonamide in intimate association but containing little or no solvent may be made, and these powders may be molded under heat and pressure to any desired shape. Filaments, yarns and other textile materials may be made from solutions containing the organic derivatives of cellulose and the naphthalene sulfonamide by extrusion through orifices into an evaporative atmosphere, as in dry spinning, or into a precipitating bath as in wet spinning.

Solutions of the organic derivative of cellulose and the naphthalene sulfonamide in a volatile solvent may be cast or extruded onto a smooth surface and the volatile solvent permitted to evaporate to form films that may be used for photographic or other purposes. An important application of this invention is in the preparation of laminated glass wherein a plastic sheet containing the derivative of cellulose and the naphthalene sulfonamide is interposed between sheets of glass. Coating compositions such as lacquers may be formed containing the derivative of cellulose and the naphthalene sulfonamide dissolved in appropriate solvent mixtures, and resins, either synthetic or natural, compatible with the derivative of cellulose may be added thereto.

The proportion of the naphthalene sulfonamide to the derivative of cellulose may be varied in accordance with the particular requirements. Generally I have found that in the case of its use with cellulose acetate, the naphthalene sulfonamide may be employed in amounts of 25 or less to 100% or more of the weight of the cellulose acetate.

In making the compositions in accordance with my invention, the naphthalene sulfonamide may be employed as the sole plastifying agent, or it may be used in conjunction with other plastifiers such as triacetin, dibenzyl tartrate, diethyl tartrate, dibutyl tartrate, diethyl phthalate, etc.

In making these compositions, solvents of appropriate nature, such as acetone, ethylene formal, methyl acetate, ethyl lactate, formal glycerol, diacetone alcohol, of varying boiling points may be used to suit the particular requirements. Effect materials such as pigments, filling materials or dyes may be added to produce any desired effect.

In order further to illustrate my invention but without being limited thereto, the following specific examples are given.

Example I

A coating composition may be made as follows:

| | Parts by weight |
|---|---|
| Cellulose acetate | 20 |
| α-naphthalene sulfonamide | 10 |
| Acetone | 200 |

Example II

The following is an example of a lacquer:

| | Parts by weight |
|---|---|
| Cellulose acetate | 20 |
| α-naphthalene sulfonamide | 10 |
| Synthetic resin of diphenylol formaldehyde type | 25 |
| Acetone | 100 |
| Alcohol | 20 |
| Benzene | 50 |
| Diacetone alcohol | 30 |

It is to be understood that the foregoing detailed description is given merely by way of illustration, and that many variations may be made therein without departing from the spirit of my invention.

Having described my invention, what I claim and desire to secure by Letters Patent is:

1. A composition of matter containing cellulose acetate and α-naphthalene sulfonamide as plasticizer.

2. A plastic composition containing cellulose acetate and α-naphthalene sulfonamide in amounts sufficient to impart desired plasticity thereto.

3. A composition of matter containing cellulose acetate and α-naphthalene sulfonamide as plasticizer in an amount equal to 50% of the weight of the cellulose acetate present.

GEORGE W. SEYMOUR.